United States Patent
Kolze et al.

(10) Patent No.: US 8,073,086 B2
(45) Date of Patent: *Dec. 6, 2011

(54) SYSTEM AND METHOD FOR LINEAR DISTORTION ESTIMATION BY WAY OF EQUALIZER COEFFICIENTS

(75) Inventors: Thomas J. Kolze, Phoenix, AZ (US); Bruce J. Currivan, Dove Canyon, CA (US)

(73) Assignee: Broadcom Corporation, Irvine, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 12/561,736

(22) Filed: Sep. 17, 2009

(65) Prior Publication Data

US 2010/0002760 A1    Jan. 7, 2010

Related U.S. Application Data

(63) Continuation of application No. 11/046,783, filed on Feb. 1, 2005, now Pat. No. 7,602,867.

(60) Provisional application No. 60/602,039, filed on Aug. 17, 2004.

(51) Int. Cl.
    *H04B 1/10* (2006.01)

(52) U.S. Cl. .............. 375/346; 375/232
(58) Field of Classification Search ............ 375/229, 375/232, 346, 348, 350; 708/322, 323
See application file for complete search history.

(56) References Cited

U.S. PATENT DOCUMENTS

| | | | |
|---|---|---|---|
| 4,631,735 A | 12/1986 | Qureshi | |
| 5,537,443 A | 7/1996 | Yoshini | |
| 5,694,437 A | 12/1997 | Yang | |
| 6,438,163 B1 | 8/2002 | Raghavan et al. | |
| 6,639,986 B2 | 10/2003 | Kanamori et al. | |
| 6,842,516 B1 | 1/2005 | Ambruster | |
| 6,934,345 B2 | 8/2005 | Chu et al. | |
| 6,980,602 B1 * | 12/2005 | Kleinerman et al. | 375/262 |
| 7,254,198 B1 | 8/2007 | Manickam et al. | |
| 2005/0157778 A1 | 7/2005 | Trachewsky et al. | |
| 2006/0153286 A1 * | 7/2006 | Andersen et al. | 375/229 |

* cited by examiner

*Primary Examiner* — Young T. Tse

(74) *Attorney, Agent, or Firm* — Sterne, Kessler, Goldstein & Fox PLLC

(57) ABSTRACT

Provided is a method and system for estimating distortion in a communications channel including an adaptive equalizer. The method includes determining one or more adaptive filter coefficients associated with a signal passed through the equalizer. The method also includes estimating un-equalized channel distortion based upon the determined adaptive filter coefficients.

14 Claims, 7 Drawing Sheets

SYSTEM AND METHOD FOR LINEAR DISTORTION ESTIMATION BY WAY OF EQUALIZER COEFFICIENTS

CROSS-REFERENCE TO THE RELATED APPLICATIONS

This application is a Continuation of U.S. application Ser. No. 11/046,783 filed on Feb. 1, 2005, now U.S. Pat. No. 7,602,867, which claims the benefit of U.S. Provisional Application No. 60/602,039 filed Aug. 17, 2004, the disclosures of which are incorporated herein by reference.

BACKGROUND OF THE INVENTION

1. Field of the Invention

The present invention relates to estimating distortion levels in a channel of a communications system.

2. Related Art

Conventional communications systems, such as a Data Over Cable Service Interface Specification (DOCSIS) based upstream systems, often receive burst communications. To provide channel fidelity, such as adequate signal to noise ratio (SNR) and signal power to distortion power ratio, many of these DOCSIS based systems (e.g., receivers) provide channel equalization. For short bursts that occur within suboptimal receivers, equalized receiver channels may provide little, if any, improvement over un-equalized channels. Thus, channel fidelity of short bursts, especially in the case of these suboptimal receivers, will be problematic.

During short bursts, the practicality of using equalizer techniques such as adaptive equalization, may be limited because the bursts may be too short to trigger or retain equalization benefits provided within the channel. For example, many users may be contending for available channels within the system, with each channel employing unique user dependent equalization techniques.

The unique equalization technique employed is typically predicated upon receipt and analysis of user data that is at least of minimum duration. A short communications burst, however, may not meet this minimum duration criteria. Therefore, although these short bursts may occur in an equalized channel, they can occur without the benefit of equalization when their duration is shorter than the required minimum. One method in the current art for overcoming this problem is for the subscriber to send periodic training or ranging bursts, which contain largely known symbol patterns or training sequences. The receiver uses these training sequences to estimate the channel response and spectrum of any interference and noise on the channel. The receiver then downloads equalizer coefficients to a pre-equalizer in the subscriber transmitter. This method of pre-equalization benefits both short and long packets sent by the subscriber.

Before the challenge of ensuring adequate channel fidelity can be remedied, it must be quantified. That is, before system designers and engineers can provide adequate channel fidelity for all users, they should especially understand the extent to which short burst communications can become degraded, or distorted. In addition, there may be historical or economic reasons why equalization is not practicable in a given communications system. For example, the installed base of legacy modems may not support pre-equalization.

One traditional technique for understanding channel distortion associated with short bursts, involves estimating a performance metric, such as the signal power to distortion power ratio. More specifically, this traditional technique includes estimating the signal power to distortion power ratio in a communications channel devoid of equalization. Although this traditional technique can be implemented using several different approaches, none of the resulting estimations are particularly reliable.

One other traditional approach to estimating channel fidelity includes designing more complex receivers. More complex receivers, however, are less desirable because of factors such as cost, speed, and power consumption. Also, since many communication systems include thousands of channels. So more complex hardware and complex approaches that require, for example, special data development techniques, are undesirable.

What is needed, therefore, is a system and method for estimating the fidelity, or SNR, of a communications channel used without equalization.

SUMMARY OF INVENTION

Consistent with the principles of the present invention as embodied and broadly described herein, the present invention includes a method for estimating distortion in a communications channel including an adaptive equalizer. The method includes determining one or more adaptive filter coefficients associated with a signal passed through the equalizer. The method also includes estimating un-equalized channel distortion based upon the determined adaptive filter coefficients. It is assumed that the channel(s) has little or no narrowband interference or "ingress" (i.e., it contains predominantly white noise) and has a very high SNR (e.g., >30 dB) with respect to the background white noise.

The present invention provides a unique technique for estimating channel fidelity given the tap coefficients of an adaptive equalizer used within a communications channel within, for example, a set top cable box or a cable modem.

In one embodiment of the present invention, a channel is first tested or sounded using a training or ranging transmission. Next, receive equalization coefficients are developed based upon these tests. These coefficients can be analyzed to determine whether the fidelity of the channel will support the desired communications without the need of receiver equalization.

By knowing the fidelity of the communications channel without equalization, communications bursts can be formatted such that the bursts will successfully cross the channel without equalization. Especially for very short bursts (e.g., only a few bytes of information), a lower order modulation (such as QPSK) can be employed. This lower order modulation should have a sufficient preamble and include forward error correction to provide reliable communications across the channel without pre-equalization and with little, if any, receive equalization.

Pre-equalization can also be implemented, if the system supports it, and subsequent residual receive equalizer coefficients can be developed. The coefficients are then analyzed to assess the fidelity (e.g., channel linear distortion) provided in light of pre-equalization.

Receiver equalization techniques can also be implemented. Since ranging and other overhead types of transmissions are often afforded in communications systems for user channels, it is often the case that receiver equalization coefficients are readily available. For systems that support generation of pre-equalization coefficients, this data can be readily generated and provided. Thus, it is desirable that the present inventive technique not be overly burdensome and complex, but be accurate and reliable for estimating the linear distortion of the channel.

In another embodiment of the present invention, a difference filter is determined between an all-pass equalizer (i.e., perfect impulse response) and a feed forward equalizer. The feed forward equalizer is developed in relation to one or more of the communication channels. This approach is referred to as the time domain approach and applies equally for a receiver equalizer or for a calculated transmitter pre-equalizer.

In this time domain approach, the power is determined in the difference filter, (e.g., channel linear distortion filter) that is being equalized by the channel. This computationally efficient method is referred to as the time domain technique because it determines the difference filter power via integration of the impulse response of the difference filter, in the time domain.

In yet another embodiment of the present invention, an estimate of the channel response is determined by inverting the adaptive equalizer filtering, after phase slope compensation. This approach is known as the frequency domain approach. The distortion from this estimate of the channel response is determined and compared to an all-pass filter. A gain adjustment is made on the channel estimate frequency response (generated by inverting the frequency response of the equalizer, basically) to provide proper normalization.

The time domain approach, summarized above, does not take the inverse. However, as long as a determined channel frequency response is not substantially deviated from unity, failing to take the inverse may only introduce modest inaccuracy. The time domain approach, for example, basically approximates $1/(1-\text{epsilon})$ with $1+\text{epsilon}$.

Further features and advantages of the present invention as well as the structure and operation of various embodiments of the present invention, are described in detail below with reference to the accompanying drawings.

BRIEF DESCRIPTION OF THE DRAWINGS

The accompanying drawings, which are incorporated herein and constitute part of the specification, illustrate embodiments of the present invention and, together with the general description given above and the detailed description of the embodiments given below, serve to explain the principles of the invention. In the drawings.

DETAILED DESCRIPTION OF INVENTION

Figure 1:
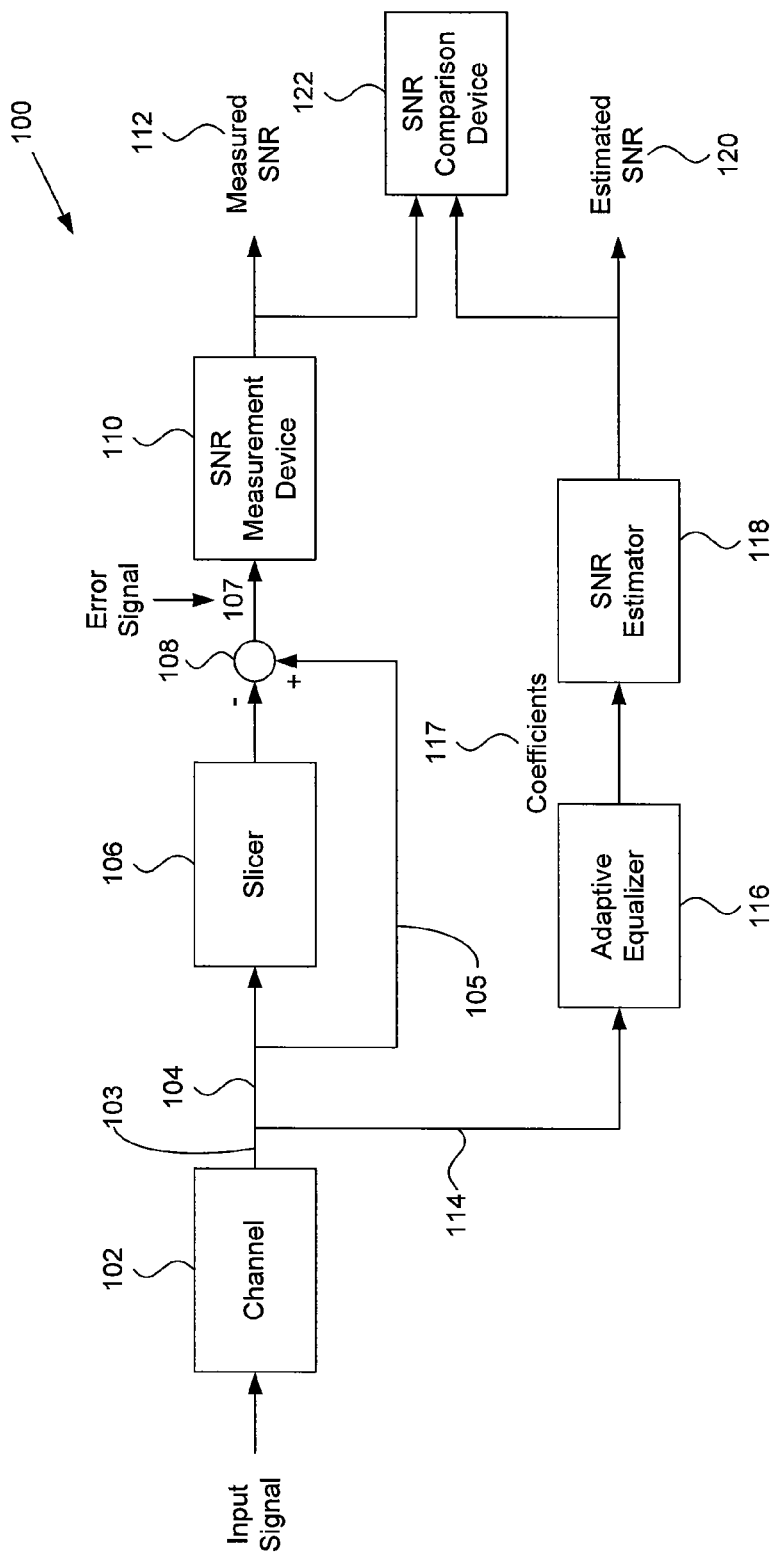
FIG. 1 is a block diagram illustration of a basic test system that embodies the present invention.

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appended claims.

It would be apparent to one skilled in the art that the present invention, as described below, may be implemented in many different embodiments of hardware, software, firmware, and/or the entities illustrated in the drawings. Any actual software code with the specialized controlled hardware to implement the present invention is not limiting of the present invention. Thus, the operation and behavior of the present invention will be described with the understanding that modifications and variations of the embodiments are possible, given the level of detail presented herein.

FIG. 1 is a block diagram illustration of a basic test system tool 100 in which the present invention can be implemented. In the system 100 of FIG. 1, an input signal is received within a communications channel 102 to produce a channel output signal 103. The channel output signal 103 is forwarded along an un-equalized communications path 104. The communications channel 102 can include, for example, a conventional communications receiver.

Next, the output signal 103 is forwarded to un-equalized slicer 106, where an initial symbol determination is made. A sliced signal, output from the slicer, is forwarded to a combiner 108. At the same time, the un-equalized output signal 103 is also forwarded along an alternate path 105 to the combiner 108, where it is combined with the sliced signal to form an error signal 107. Next, a SNR measurement device 110 measures the SNR of the error signal 107. The SNR measurement device 110 produces an actual SNR measurement value 112, which can then be used as a bench metric by a system tester.

The output signal 103 is also forwarded along a parallel communications path 114. The parallel path 114, however, provides equalization. For example, along the path 114, the output signal 103 is provided as an input to an adaptive equalizer 116. The adaptive equalizer 116 determines equalization coefficients associated with the output signal 103, as forwarded through the communications channel 102. The adaptive equalizer 116 produces equalizer coefficients 117 as an output. The equalizer coefficients 117 are provided as an input to an SNR estimator 118.

The purpose of the SNR estimator 118 is to estimate what the SNR of the slicer 106 would have been if the equalizer were not present. This estimation is accomplished within the SNR estimator 118 by analyzing the equalizer coefficients 117. The distortion in the channel 102 can then be inferred from the coefficients 117, and the error power resulting from that distortion can be estimated, resulting in an estimated SNR 120.

Next, the measured SNR 112 and the estimated SNR 120 are compared within an SNR comparison device 122 to determine how well the SNR estimator 118 succeeded in predicting the SNR of the un-equalized output of the channel 102 along the communications path 104. During testing, it has been noted that the measured SNR 112 and the estimated SNR 120 have matched within about 1 dB in typical upstream DOCSIS channels.

Figure 2:
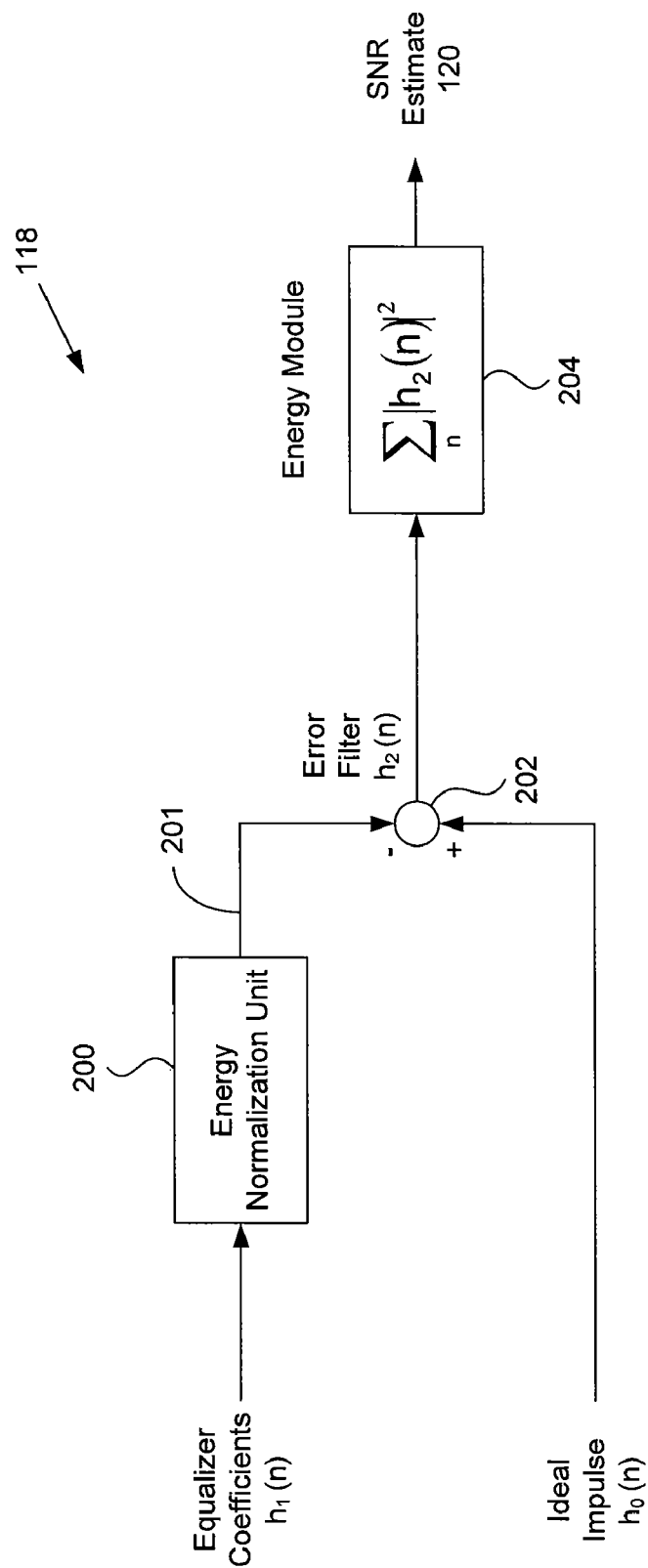
FIG. 2 is a block diagram illustration of a distortion estimator used in the test system of FIG. 1, constructed in accordance with one embodiment of the present invention.

FIG. 2 is a block diagram illustration of the SNR estimator 118 of FIG. 1, based upon one implementation of the time domain approach. In FIG. 2, the equalizer coefficients 117, expressed here as $h_1(n)$, are created by training the adaptive equalizer 116 on the output signal 103, passed through the channel 102 of FIG. 1. The coefficients $h_1(n)$ are received as inputs to an energy normalization unit 200, where the coefficients are normalized to unit energy, producing normalized coefficients 201.

The normalized coefficients 201 are then differenced with an ideal channel response (i.e., delayed unit impulse) $h_0(n)$ within a combiner 202. The combiner 202 produces a difference sequence $h_2(n)$ as an output. The delayed unit impulse is defined as a value of 1 in the same position of the main tap of the equalizer coefficients $h_1(n)$, with all other elements of the unit impulse sequence being zeros. Additionally, the delayed unit impulse has the same overall length as the equalizer coefficient sequence $h_1(n)$.

The difference sequence $h_2(n)$ is also known in the art as an error filter response. If the channel 102 was an ideal channel, the equalizer taps $h_1(n)$ would also be an impulse response, and the difference sequence $h_2(n)$ would be all zeros. Energy within the error filter, which is a measure of distortion, is determined within an energy module 204. The error filter energy is measured to produce the SNR estimate 120, shown in FIG. 1.

Figure 3:
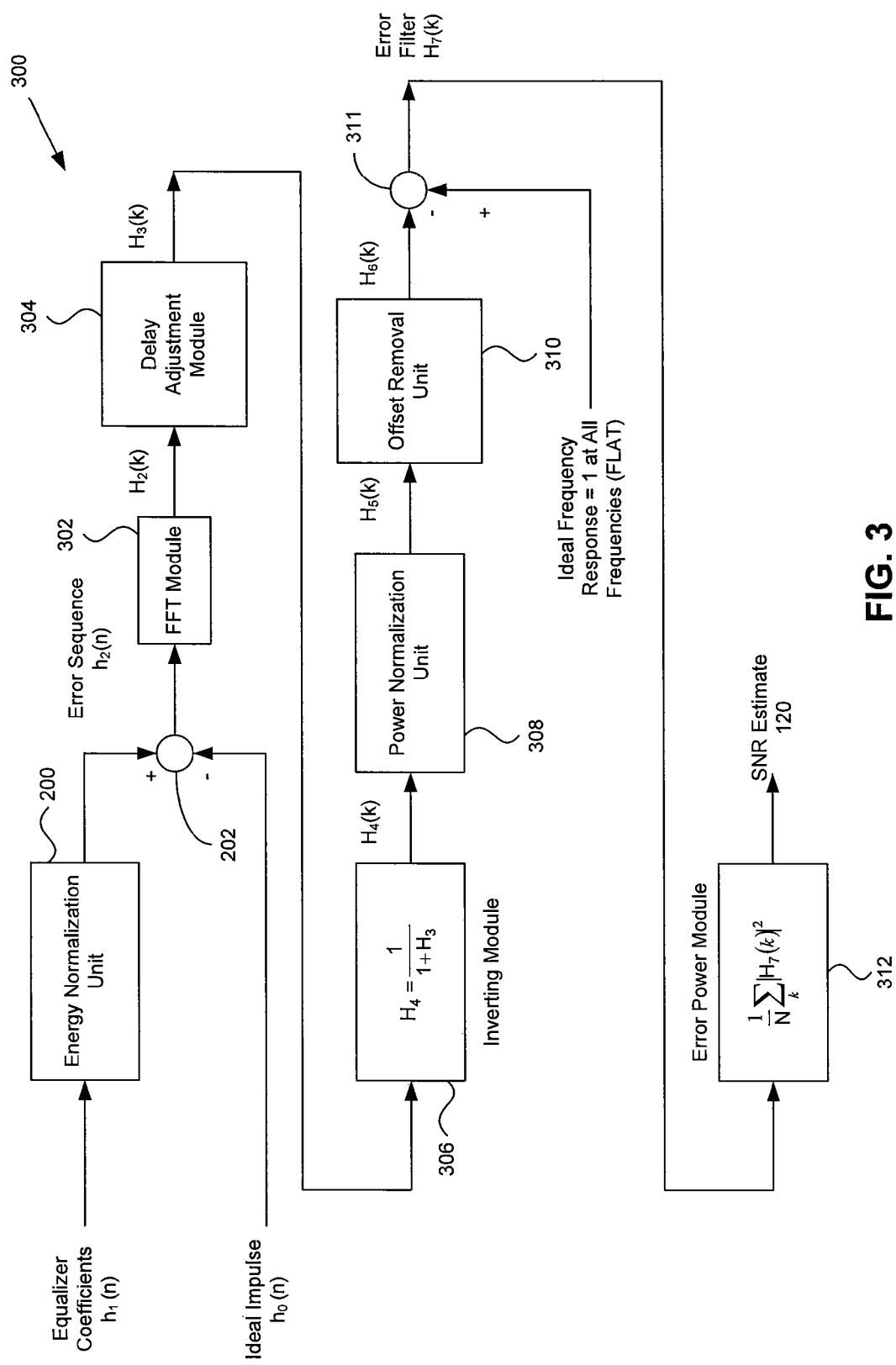
FIG. 3 is a block diagram illustration of the distortion estimator used in the test system of FIG. 1, constructed in accordance with another second embodiment of the present invention.

FIG. 3 is a block diagram illustration 300 of the SNR estimator 118 of FIG. 1, based upon one implementation of the frequency domain approach. In FIG. 3, the equalizer coefficients $h_1(n)$, that resulted from training the adaptive equalizer 116, are again received as an input to the energy normalization unit 200, where the error sequence $h_2(n)$ is determined. In the frequency domain approach of FIG. 3, a fast Fourier transform (FFT) of $h_2(n)$ is taken within an FFT module 302, yielding $H_2(k)$. The term $H_2(k)$ is the frequency response of $h_2(n)$. Note that the term (k) is a frequency variable and is omitted in some cases, within the context of FIG. 3, for simplification. Within the FFT module 302, $h_2(n)$ is first padded with zeros in order to smooth the frequency response $H_2(k)$. The FFT (e.g., preferably of length N (typically 4096) samples) is then taken, giving the frequency-domain sequence $H_2(k)$.

Next, the delay offset of the frequency response $H_2(k)$ is adjusted within a delay adjustment module 304. A delay offset adjustment is performed since the equalizer coefficients $h_1(n)$ have their main tap in a position other than the first tap. For example, the main tap is typically the 4th tap position in an 8-tap equalizer, while the ideal channel frequency response (i.e., unity, or 1, or a flat frequency response) corresponds to a unit impulse having its unity tap in the first tap location.

More specifically, the delay adjustment, within the delay adjustment module 304, includes removing a phase response corresponding to the delay of the main tap. A delay-adjusted error frequency response $H_3(k)$ is output from the delay adjustment module 304.

The error response $H_3(k)$ is then added to the ideal channel frequency response (unity, or 1, or flat frequency response), and inverted within an inverting module 306. The inverting module 306 produces an estimated channel response $H_4(k)$ as an output. The inverting module 306 provides the estimate of the channel response $H_4(k)$ as representative of the adaptive equalizer 116 adjusting its coefficients to approximately invert the channel.

The estimated channel response $H_4(k)$ is normalized to unit power within a power normalization unit 308, producing a normalized signal $H_5(k)$. An amount of phase offset is removed from the normalized signal $H_5(k)$ within an offset removal unit 310. The offset removal unit 310 produces an output of $H_6(k)$, which is the final estimate of the channel response.

The estimated channel response $H_6(k)$ is then subtracted from the ideal channel frequency response (unity, or 1, or flat frequency response) within a combiner 311. The combiner 311 produces as an output, an error filter response $H_7(k)$, which represents a measure of the distortion. Error energy is determined within an error power module 312. An output of the error power module 312 is a slightly more accurate reading of the SNR estimate 120, than the estimate produced by the time domain approach of FIG. 2.

Figure 4:
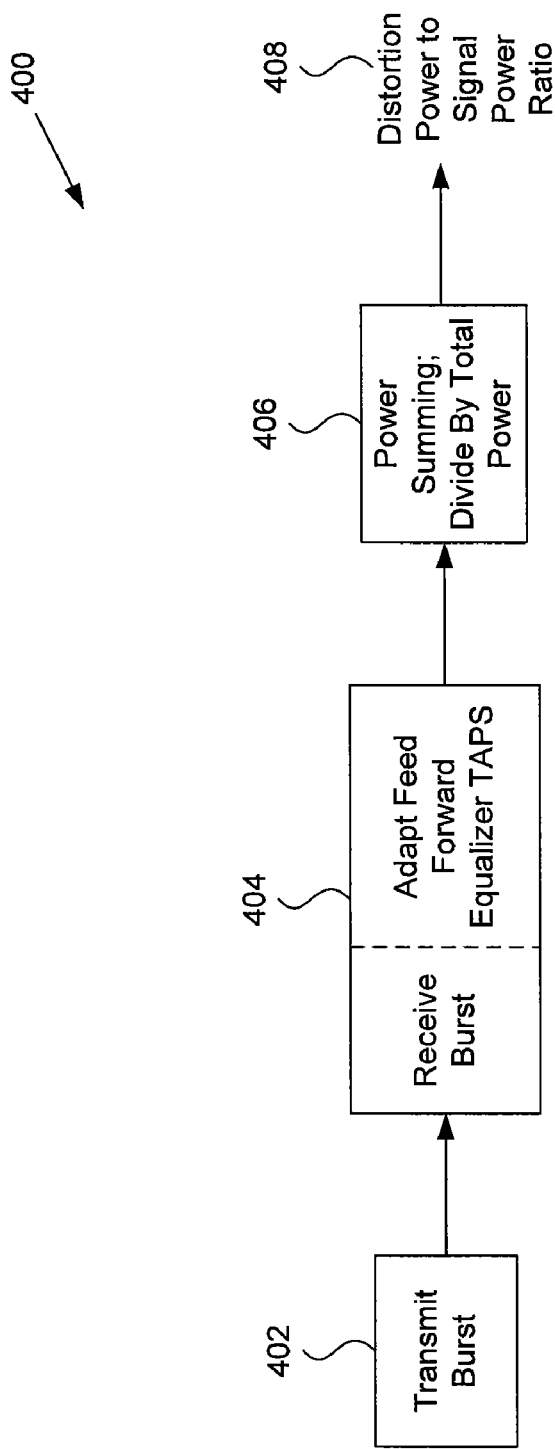
FIG. 4 is a flow diagram of a conventional technique for estimating linear distortion in accordance with yet another embodiment of the present invention.

FIG. 4 is a flow diagram of a technique 400 for estimating linear distortion in accordance with another embodiment of the present invention. In FIG. 4, a communications burst is transmitted, for example, from a communications transmitter, as indicated in step 402. Next, the transmitted burst is received, for example, within a receiver equalizer and feed forward equalizer taps are adapted, as indicated in step 404. In step 406, power is summed in all the tap coefficients, except the main tap. This sum is then divided by the total tap power to produce a distortion power to signal power ratio metric 408. This signal power to distortion power ratio is simply one metric by which an estimate of the distortion, created on a digital communications channel, can be measured.

Figure 5:
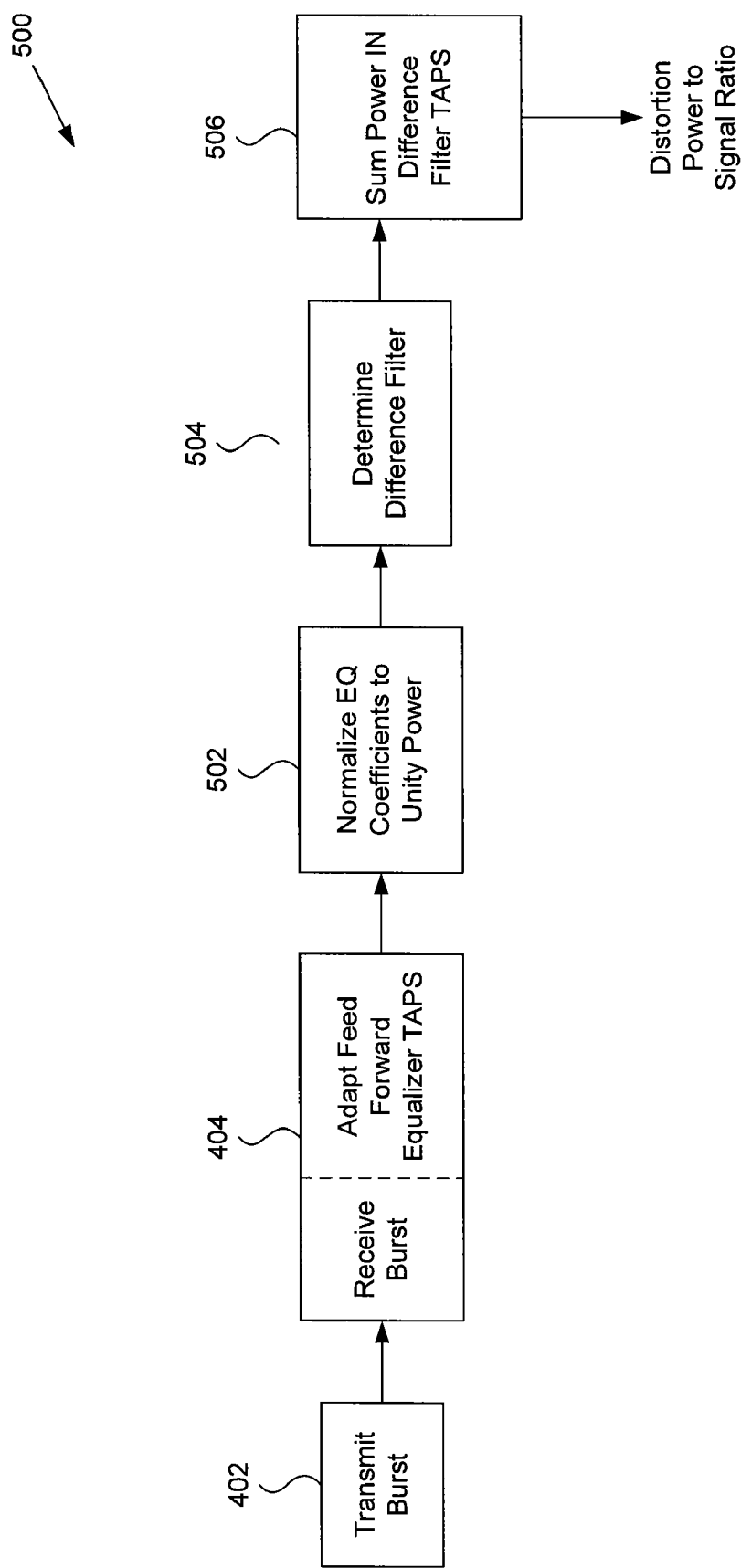
FIG. 5 is a flow diagram illustration of a method for estimating linear distortion via adaptive equalizer taps in accordance with yet another embodiment of the present invention.

FIG. 5 is a flow diagram illustration of a method 500 for estimating linear distortion via adaptive equalizer taps, based upon another implementation of the time domain approach. In the method 500, steps 402-404 are performed, as illustrated in FIG. 4. Next, a gain correction is performed such that when the power in all the adaptive equalizer taps are summed, the result is the normalized unity power, as indicated in step 502.

In step 504, a difference filter is determined. The difference filter is the difference of an all-pass filter, with the same power as the normalized equalizer filter, and the same delay as the equalizer has to its main tap, or decision tap. In other words, in the case of unity power normalization, the all-pass filter has value of 1 in the main tap location of the equalizer filter and a value of zero for the coefficients of all the other tap locations. The power in this difference filter can be determined in the time domain. The main tap, however, is the difference between unity and the equalizer main tap coefficient.

The time domain implementation of FIG. 5 in essence approximates the inverse equalizer filter by using the equalizer filter amplitude response as a substitute. To examine how this might work as an approximation, recall that for absolute value of "epsilon" very small compared to unity, $$1/(1+\text{epsilon}) \approx 1-\text{epsilon}. \quad \text{[Equation 1]}$$

Thus, $$\text{"adjusted inverse equalizer filter"} = \text{all pass filter plus residual distortion}, \quad \text{[Equation 2]}$$

$$= 1+\text{epsilon}. \quad \text{[Equation 3]}$$

Typically, $$\text{"equalizer filter"} \approx 1/\text{"adjusted inverse equalizer filter"} \quad \text{[Equation 4]}$$

$$= 1/(1+\text{epsilon}) \quad \text{[Equation 5]}$$

Thus, $$\text{"equalizer filter"} \approx 1/(1+\text{epsilon}) \approx 1-\text{epsilon}. \quad \text{[Equation 6]}$$

And note that in the Time Domain technique the "difference filter" is determined such that:

$$\text{"equalizer filter"} = \text{all-pass filter plus "difference filter."} \quad \text{[Equation 7]}$$

Thus, comparing the expressions for the "equalizer filter" in Equations 6 and 7, it can be seen that the frequency response of the "difference filter" is well-approximated as "difference filter"≈−epsilon, as long as the residual distortion filtering is small at all frequency samples.

The residual distortion in the frequency domain approaches, generally, is represented by epsilon [actually, a different value at each frequency bin, such as epsilon(f)]. The frequency response of the difference filter in the time domain technique is approximated as (−epsilon). Although there is a negative sign which is not shared, this is irrelevant when the distortion power is calculated in the techniques of the present invention. (Note that in the time domain technique, the frequency response is not actually determined. The distortion power is determined in the time domain.)

Thus, if the residual distortion in the adjusted inverse equalizer channel, represented at each frequency sample by epsilon in the above approximation, is very small in amplitude, then it is well approximated by the difference filter determined from the taps in the time domain technique. This is true except for the negative sign, which, when calculating power (as in the distortion power), becomes insignificant.

Figure 6:
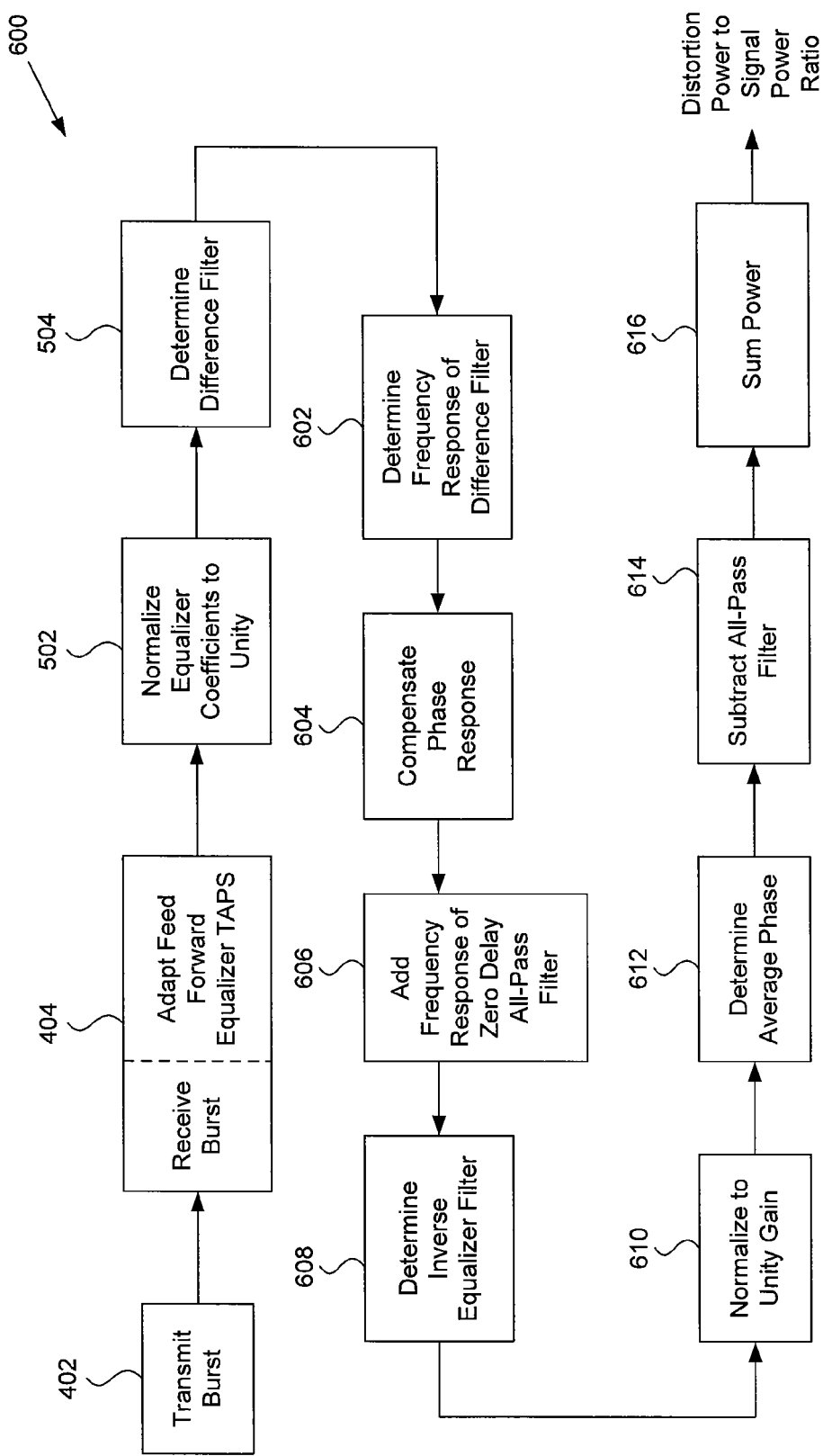
FIG. 6 is a flow diagram illustration of a basic method for estimating linear distortion via adaptive equalizer taps in accordance with an additional embodiment of the present invention.

FIG. 6 is a flow diagram illustration of a method 600 for estimating linear distortion via adaptive equalizer taps, based upon another implementation of the frequency domain approach. In FIG. 6, the method 600 performs steps 402-404, shown in FIG. 4 and step 502 shown in FIG. 5. The method 600 also includes step 504 of FIG. 5, which determines the difference filter.

Next, step 602 of FIG. 6 determines the frequency response of the difference filter. The frequency response is determined by taking the FFT of the difference filter, converting the difference filter from time domain to frequency domain. In step 604, a phase slope corresponding to the delay to the decision tap (i.e., main tap) of the adaptive equalizer is compensated or removed from the frequency response, determined in step 602. This is the true frequency response of the residual filtering applied by the equalizer. In step 606, this residual equalizer frequency response is added to the all-pass, zero-delay, flat phase, gain normalized filter.

The residual equalizer filter serves as the ideal reference (normalized to the same power as used for normalizing the equalizer in the time domain), yielding the delay-compensated (i.e., zero-delay) equalizer frequency response. Note that this composite filter can be determined by delay compensating the frequency response of the equalizer.

In step 608, one frequency sample at a time, the zero-delay equalizer frequency response is inverted. That is, the multiplicative complex inverse is determined for each sample. The result is the inverse equalizer filter, which is the multiplicative inverse of the equalizer. When the multiplicative inverse is concatenated with the equalizer, the flat response (i.e., zero phase response with only delay), is provided.

In a zero-forcing equalizer, or a least mean square (LMS) equalizer with no noise and perfect convergence of the equalizer tap coefficients, this inverse equalizer filter is the channel frequency response for which the equalizer would perfectly compensate.

Adapting with a zero-forcing technique (i.e., LMS technique with no noise), the equalizer itself is the best equalizer (best in a mean-squared error fit) of its length (number of taps), and main tap location, that can be obtained. Note that with a T-spaced equalizer, and with symbol shaping modulation, the mean-squared error best fit, just referenced, actually becomes a weighted fit in the frequency domain. This is not an equal weighting of the distortion or error at each frequency sample.

This inverse equalizer filter represents the channel frequency response which the equalizer is perfectly compensating. The distortion power in this filter represents the best approximation of the linear distortion which can be gleaned from the equalizer taps (assuming nonlinear distortion and noise are negligible during the equalizer convergence).

The inverse equalizer filter provides good information about the channel distortions the equalizer is combating. However, it is a less optimal method for determining the linear distortion the channel imposes upon digital modulation. Receivers of digital modulation transmissions must develop carrier tracking, including carrier phase estimation and compensation. Similarly, for modulation schemes such as 16QAM (and higher density), good gain adjustments should be developed for the receivers to distinguish higher amplitude symbols from lower amplitude symbols during the transmissions.

As such, any final manipulations of the inverse equalizer filter comprise a gain adjustment, normalizing the power of this filter (e.g., to unity), as indicated in step 610. In step 612, an average phase is determined and the phase is de-rotated. This brings the average phase of the frequency response of the inverse equalizer filter, to zero degrees. By way of example, there are several methods to consider for determining the average phase.

One exemplary method for determining the average phase of step 612 performs a vector addition of the complex values of all the frequency samples in the inverse equalizer filter. This particular method also uses the phase of the resultant complex vector as the phase of the (i.e., estimated) channel which is to be zeroed out (i.e., rotated out).

Another technique for determining the average phase, for example, can include weighting the frequency response complex samples with the power spectral density of the digital modulation.

Finally, the gain and phase compensated inverse equalizer filter is processed to generate the estimated distortion due to the channel linear filtering, which is imposed upon digital modulation. In step 614, the all-pass filter is subtracted from the adjusted inverse equalizer filter, frequency-sample-by-frequency-sample, to create the frequency response of the estimated residual distortion.

In step 616, the power in this residual distortion is totaled and compared with the power in the all-pass filter (all-pass filter power/residual distortion power). This total produces the estimated distortion-to-signal power ratio of the estimated linear filtering of the channel, derived from adaptive equalizer taps adapted via use of the channel.

Figure 7:
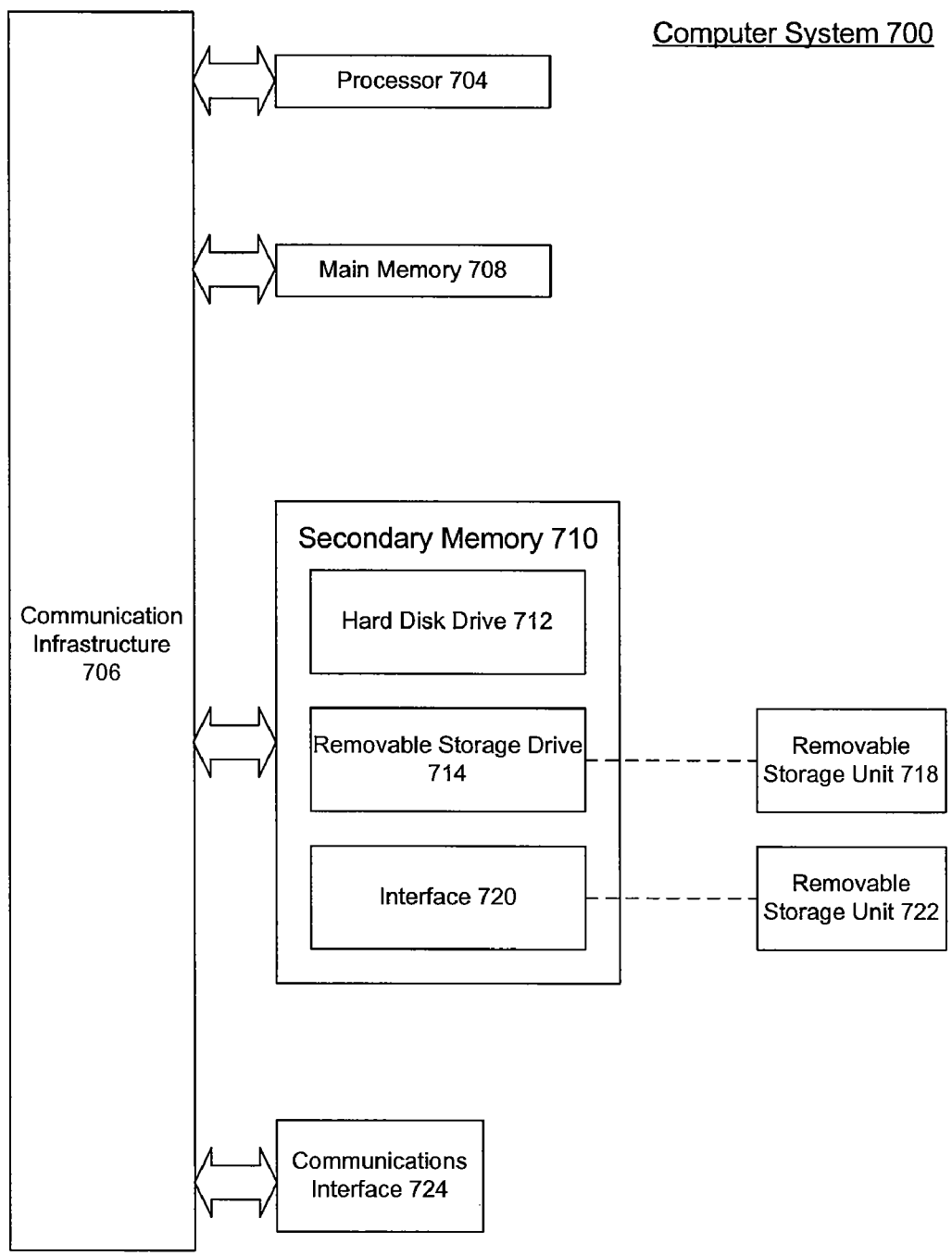
FIG. 7 is a block diagram of an exemplary computer system on which the present invention can be practiced.

FIG. 7 is a block diagram of an exemplary computer system on which the present invention can be practiced. The following description of the exemplary computer system is provided for completeness. The present invention can be implemented in hardware, or as a combination of software and hardware. Consequently, the invention may be implemented in the environment of a computer system or other processing system.

In the present invention, all of the elements depicted in FIGS. 1-6, for example, can execute on one or more distinct computer systems 700, to implement the various methods of the present invention. The computer system 700 includes one or more processors, such as a processor 704. The processor 704 can be a special purpose or a general purpose digital signal processor.

The processor 704 is connected to a communication infrastructure 706 (for example, a bus or network). Various software implementations are described in terms of this exemplary computer system. After reading this description, it will become apparent to a person skilled in the relevant art how to implement the invention using other computer systems and/or computer architectures.

The computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc.

The removable storage drive 714 reads from and/or writes to a removable storage unit 718 in a well known manner. The removable storage unit 718, represents a floppy disk, magnetic tape, optical disk, etc. which is read by and written to by the removable storage drive 714. As will be appreciated, the removable storage unit 718 includes a computer usable storage medium having stored therein computer software and/or data.

In alternative implementations, the secondary memory 710 may include other similar means for allowing computer programs or other instructions to be loaded into the computer system 700. Such means may include, for example, a removable storage unit 722 and an interface 720.

Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to the computer system 700.

The computer system 700 may also include a communications interface 724. The communications interface 724 allows software and data to be transferred between the computer system 700 and external devices. Examples of the communications interface 724 may include a modem, a network interface (such as an Ethernet card), a communications port, a PCMCIA slot and card, etc.

Software and data transferred via the communications interface 724 are in the form of signals which may be electronic, electromagnetic, optical or other signals capable of being received by the communications interface 724. These signals are provided to the communications interface 724 via a communications path. The communications path carries signals and may be implemented using wire or cable, fiber optics, a phone line, a cellular phone link, an RF link and other communications channels.

In this document, the terms computer program medium and computer readable medium are used to generally refer to media such as the removable storage drive 714, a hard disk installed in hard disk drive 712, and the signals. These computer program products are means for providing software to the computer system 700.

Computer programs (also called computer control logic) are stored in the main memory 708 and/or the secondary memory 710. Computer programs may also be received via the communications interface 724. Such computer programs, when executed, enable the computer system 700 to implement the present invention as discussed herein. In particular, the computer programs, when executed, enable the processor 704 to implement the processes of the present invention. Accordingly, such computer programs represent controllers of the computer system 700.

By way of example, in the embodiments of the invention, the processes/methods performed by signal processing blocks of encoders and/or decoders can be performed by computer control logic. Where the invention is implemented using software, the software may be stored in a computer program product and loaded into the computer system 700 using the removable storage drive 714, the hard drive 712 or the communications interface 724.

CONCLUSION

The present invention provides a unique technique for estimating channel fidelity given the tap coefficients of an adaptive equalizer used within a communications channel within, for example, a set top cable box or a cable modem.

One advantage of the present invention is that it provides a good estimate of the distortion imposed by a channel upon digital modulation. This is especially true when adaptive equalization is not used, either by choice, or when equalization is not capable of being fully converged (such as with short transmission bursts, without pre-equalization). Additionally, the present invention uses commonly available data in a communications system since equalizer coefficients are commonly developed on the long ranging burst(s) required for initial registration of a user into a system, such as with DOCSIS.

The frequency domain approach, noted above, primarily requires, for example, an FFT-based technique (starting with only small number of time domain samples) and phase compensation (complex multiplies) across the frequency samples. The FFT technique also includes addition across the frequency samples (of the all-pass filtering), complex multiplicative inversion across the frequency samples, several normalizations (gain and phase), and subtraction across the frequency domain (of the all-pass filter). Finally, The FFT technique performs a power computation across the frequency domain.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

Any such alternate boundaries are thus within the scope and spirit of the claimed invention. One skilled in the art will recognize that these functional building blocks can be implemented by analog and/or digital circuits, discrete components, application-specific integrated circuits, firmware, processor executing appropriate software, and the like, or any combination thereof. Thus, the breadth and scope of the present invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The Detailed Description section should primarily be used to interpret the claims. The Summary and Abstract sections may set forth one or more, but not all exemplary embodiments of the present invention as contemplated by the inventor(s), and thus, are not intended to limit the claims.

What we claim is:

1. A method for estimating channel distortion in a communications channel including an adaptive equalizer, comprising:
   determining one or more adaptive filter coefficients $h_1(n)$ associated with a signal by the adaptive equalizer;
   normalizing the determined one or more adaptive filter coefficients to unit energy; and
   differencing the normalized one or more adaptive filter coefficients with an ideal response $h_0(n)$ of the communications channel, the differencing producing an error sequence $h_2(n)$.

2. The method of claim 1, further comprising determining an energy of the error sequence.

3. The method of claim 1, further comprising:
   converting the error sequence to frequency domain, the converting producing a frequency response $H_2(k)$ of the error sequence; and
   removing a delay offset of the frequency response to produce a delayed offset response $H_3(k)$.

4. The method of claim 3, further comprising:
   (i) summing the delayed offset response and an ideal channel frequency response and (ii) inverting the sum to produce an inverted response $H_4(k)$;
   normalizing the inverted response to unit power, thus producing a normalized response $H_5(k)$; and
   removing a phase offset from the normalized inverted response, the removing producing an estimated channel response $H_6(k)$.

5. The method of claim 4, further comprising:
   differencing the estimated channel response $H_6(k)$ with the ideal channel frequency response, the differencing producing an error filter response $H_7(k)$; and
   determining an error power of the difference.

6. The method of claim 3, wherein the converting is based upon a fast Fourier transform of the error sequence.

7. The method of claim 3, wherein the converting is based upon (i) padding the error sequence with zeros and (ii) applying a fast Fourier transform (FFT) to the padded error sequence.

8. The method of claim 7, wherein the FFT includes at least 4096 samples.

9. A method for estimating channel distortion in a communications channel including an adaptive equalizer, comprising:
   receiving data within the communications channel and converging taps of the adaptive equalizer when the data is received;
   determining a sum of tap power values, the sum including a power of a main tap;
   normalizing the taps to unity power;
   determining a difference filter from the normalized taps; and
   summing a power of taps of the difference filter.

10. An apparatus for estimating channel distortion in a communications channel including an adaptive equalizer, comprising:
    means for determining one or more adaptive filter coefficients $h_1(n)$ associated with a signal by the adaptive equalizer;
    means for normalizing the determined one or more adaptive filter coefficients to unit energy; and
    means for differencing the normalized one or more adaptive filter coefficients with an ideal response $h_0(n)$ of the communications channel, the differencing producing an error sequence $h_2(n)$.

11. The apparatus of claim 10, further comprising means for determining an energy of the error sequence.

12. The apparatus of claim 10, further comprising:
    means for converting the error sequence to frequency domain, the converting producing a frequency response $H_2(k)$ of the error sequence; and
    means for removing a delay offset of the frequency response to produce a delayed offset response $H_3(k)$.

13. The apparatus of claim 12, further comprising:
    means for (i) summing the delayed offset response and an ideal channel frequency response and (ii) inverting the sum to produce an inverted response $H_4(k)$;
    means for normalizing the inverted response to unit power, thus producing a normalized response $H_5(k)$; and
    means for removing a phase offset from the normalized inverted response, the removing producing an estimated channel response $H_6(k)$.

14. The apparatus of claim 13, further comprising:
    means for differencing the estimated channel response $H_6(k)$ with the ideal channel frequency response, the differencing producing an error filter response $H_7(k)$; and
    means for determining an error power of the difference.

* * * * *